United States Patent Office 3,337,969
Patented Aug. 29, 1967

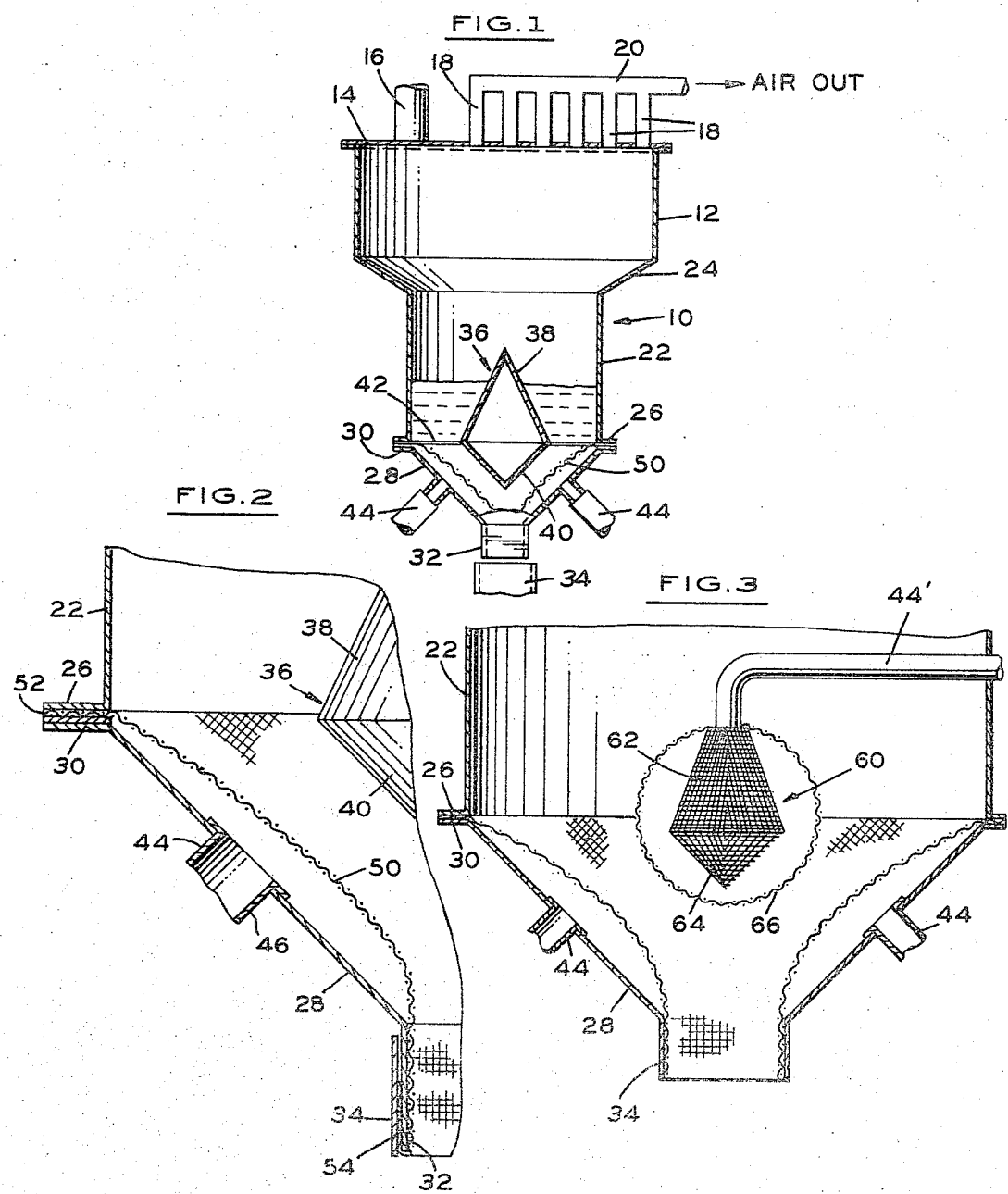

3,337,969
PLASTIC MATERIAL DRYER
Arthur E. Maus, Detroit, Mich., assignor to Thoreson-McCosh, Inc., Detroit, Mich., a corporation of Michigan
Filed Feb. 11, 1965, Ser. No. 431,855
4 Claims. (Cl. 34—174)

This invention relates to apparatus for handling plastic material, and particularly to apparatus for drying and preheating powdered or granular plastic material preparatory to delivering the material to a molding or extruding apparatus.

The apparatus shown herein is somewhat similar to that shown in the U.S. Patent of Frederick I. McCosh, No. 2,916,831, assigned to the assignee of this application. The instant application however, is restricted to a dryer-heater and does not include any conveyor for the material. A conveyor such as disclosed in the patent may be employed in conjunction with the apparatus of this invention.

A principal object of the invention is the provision of apparatus for heating and drying particulate plastic material, which apparatus is of high efficiency and capacity while at the same time being economical to manufacture.

Another object is the provision of apparatus of the above character having a flexible sheet of foraminous material disposed in a conically shaped section of the apparatus through which the plastic material flows, with heating and drying air being introduced into such section, the openings in said flexible sheet being smaller than the particle size of the material so that as the material flows over the sheet the air passes through the sheet and thence through the material to intimately contact all the plastic particles.

Other objects, advantages and meritorious features will more fully appear from the following specification, claims and accompanying drawing, wherein:

FIG. 1 is a vertical cross section taken through an apparatus for drying and heating particulate plastic material embodying the invention;

FIG. 2 is an exploded cross section of a portion of the lower end of the apparatus shown in FIG. 1 showing in detail the foraminous sheet member and its attachment to the apparatus; and FIG. 3 is a partial cross section of the lower end of a modified apparatus.

Referring to the drawing in FIG. 1 there is shown a plastic material drying and heating apparatus comprising a hopper generally indicated at 10, which is divided into three sections. The upper section 12 may be of cylindrical configuration, and is closed at its top by a cover 14. Opening through the cover is a material inlet conduit 16 and a plurality of air outlet conduits 18 which communicate with another conduit 20. The latter may be connected to any suitable air cleaning device (not shown) so that the air may be recirculated as will become apparent hereinafter.

An intermediate hopper section 22 is also preferably cylindrical, but of less diameter than section 12, and it is joined thereto by a truncated cone portion 24 as shown. At its lower end section 22 is provided with an outwardly projecting peripheral flange 26.

The lowermost section 28 of the hopper is of inverted conical shape as shown and is provided at its upper end with an outwardly projecting flange 30 registering with the flange 26 on the section 22. The flanges 26 and 30 may be secured together in any convenient fashion as by bolts extending therethrough (not shown). The lower end of conical section 28 defines an outlet opening communicating with a material conduit 32. Telescopically received over the conduit 32 is a material delivery pipe 34 through which the dried and heated plastic material is conveyed to the point of use.

Disposed axially in the hopper 10 is a material deflector 36 which comprises two cones, upper 38 and lower 40 joined together at their bases. The deflector 36 is imperforate and is suspended in the hopper by means of support arms or the like 42 so that the widest dimension of the deflector lies substantially opposite the juncture between hopper sections 22 and 28 as shown. The walls of the upper cone 38 are preferably at an angle of at least 60 degrees with respect to the base, while the walls of the lower cone 40 lie parallel, or nearly so, to the bottom hopper section 28. It has been found that the configuration of lower cone 40 is not as critical as upper cone 38.

Spaced apart along the hopper section 28 are a plurality of air inlet openings 44, two of which are shown in FIG. 1, which openings communicate with air delivery conduits 46 leading to a source of heated air (not shown). Heating and drying air is introduced to the hopper section 28 through the conduits 46, passes upwardly through the plastic material in the hopper 10, and is exhausted through the conduits 18 and 20 at the top of the hopper. The air exhausted through the top of the hopper may be delivered to the atmosphere or, preferably, it may be directed through a suitable air cleaning device (not shown) thence recirculated back through the apparatus. There is, of course, provided an air heater and blower of well known construction (not shown), for heating the air and delivering it to the apparatus.

Disposed in the hopper section 28 and completely overlying the walls thereof is a flexible sheet of foraminous material 50. The sheet is preferably made of a material such as canvas or other suitable woven cloth or the like. The sheet 50 is fastened along its entire upper marginal edge 52 to the hopper 10 at the juncture of hopper sections 22 and 28 as by being interposed between the two peripheral flanges 26 and 30 of the sections and held therebetween by bolts or the like (not shown) tensioning the flanges together. The lower marginal edge 54 of sheet 50 is upturned over the lower end of the material outlet conduit 32 and is held in position by the telescopic engagement of the pipe 34 thereover. The manner of securing sheet 50 is most clearly shown in FIG. 2.

An important feature of the sheet 50 is that the openings in the sheet are smaller than the patricle size of the plastic material being handled. The openings in the sheet thereby define minute closely spaced apart orifices through which the heating and drying air is directed to intimately contact the particulate plastic material, while at the same time preventing the plastic material from passing through the sheet. Because the sheet is flexible and has a linear dimension greater than the dimension of the hopper section 28, upon the application of air pressure the sheet will be in effect inflated so as to lie spaced from the wall of hopper section 28 between its edges which are secured to the hopper and to define a generally curvilinear path as shown most clearly in FIG. 2. The sheet being flexible, tends to conform to the flow pattern of the particulate plastic material being handled as it progresses through the lowermost section 28 of the hopper, and in addition is self-cleaning because as it flexes any particles of plastic material clinging thereto will be carried off by the flow of material across the surface of the sheet.

In FIG. 3 there is shown a modified form of construction wherein the deflector 36 has been replaced by a double cone-like diffuser 60, having an upper section 62 and a lower section 64 joined at their bases. Both diffuser sections are of conical shape and are perforated so as to direct heating and drying air supplied through a branch air conduit 44' in all directions in the bin. Diffuser 60 is enveloped by a foraminous bag 66 of like material to the sheet 50. The remaining portions of the FIG. 3 embodiment are identical to similar parts shown in FIGS. 1 and 2 and have been allotted reference numerals accordingly. The bag 66 is flexible so as to conform to the pattern of flowing material as does the sheet 50 as hereinabove described.

The above-described apparatus has been found to provide a uniformity of both drying and preheating the particular plastic material not possible with prior devices. The heating and drying air is introduced through the very closely spaced minute orifices in the flexible material and thus all of the plastic particles or granules are intimately contacted by the hot air to provide a uniform material. While the temperature of the supply air may vary depending upon the characteristics of the material being handled and its rate of flow through the hopper, a range of between 120 and 300 degrees F. above ambient temperature adequately provides for most plastics. The face velocity of the air is usually kept at about 25–30 feet per minute, and a velocity of 35–40 feet per minute is seldom exceeded, while the rate of flow of air required has been found to be approximately 1 cubic foot per minute for each 2 pounds of material handled per hour.

What is claimed is:

1. Apparatus for handling particulate plastic material for delivery to a processing machine comprising: a hopper for plastic material having an inlet for the material at its upper end and having an inwardly tapering wall at its lower end provided with an outlet for said material opening through said inwardly tapering wall at the apex thereof; air inlet means in said inwardly tapering wall for introducing air through said particulate plastic material as it flows through the apparatus; and a flexible sheet of woven foraminous material secured to the hopper along the upper periphery of said inwardly tapering wall and along the periphery of said outlet opening and freely overlying the wall interiorly of the hopper intermediate said points of securement, said foraminous sheet having a linear dimension greater than the inwardly tapering wall to lie spaced therefrom upon the introduction of air through said air inlet means, with the openings in said foraminous sheet being smaller than the particle size of said plastic material to prevent passage of material therethrough while permitting air flow through the sheet and the plastic material.

2. Apparatus for handling particulate plastic material for delivery to a processing machine comprising: a hopper for said material having an upright cylindrical upper end portion and an inverted cone-shaped lower end portion provided at its apex with an outlet for said material; a plurality of air inlets opening through said lower end portion for supplying heating and drying air to said material; a cover for said hopper having material inlet means and air outlet means opening therethrough; a flexible foraminous member disposed in said lower end portion of the hopper connected at its opposite marginal edges to the upper peripheral edge of said lower end portion and the periphery of said material outlet respectively to completely cover said cone-shaped lower end of the hopper interiorly thereof, with the openings in said foraminous member being smaller than the particle size of the plastic material being handled, said foraminous member having a linear dimension exceeding the corresponding dimension of the hopper lower end portion to be inflated by air delivered through said air inlets; and a plastic material diffuser suspended in said hopper coaxially thereof and spaced upwardly in the hopper from the wall of said cone-shaped lower end portion.

3. The invention as defined in claim 2 characterized in that said deflector comprises a pair of imperforate cones joined together at their bases, with the surface of said lower cone being substantially parallel to the surface of said cone-shaped lower end portion of said hopper and with the upper cone having a vertical dimension greater than the diameter of said bases.

4. The invention defined in claim 2 characterized in that said deflector comprises a pair of perforated cones joined together at their bases, a foraminous baglike member completely enveloping the deflector and having openings therethrough smaller than the particle size of said plastic material, and air delivery means communicating with the interior of said deflector.

References Cited
UNITED STATES PATENTS

| | | | |
|---|---|---|---|
| 210,793 | 12/1878 | Luckenbach | 34—174 X |
| 245,602 | 8/1881 | Barton | 34—174 |
| 1,303,945 | 5/1919 | Nichols | 34—243 |
| 2,902,816 | 9/1959 | Rayner | 34—174 X |
| 2,916,831 | 12/1959 | McCosh | 34—174 X |

FOREIGN PATENTS

| | | |
|---|---|---|
| 907,872 | 7/1945 | France. |

FREDERICK L. MATTESON, JR., *Primary Examiner*

A. D. HERRMANN, *Assistant Examiner.*